(12) United States Patent
Hofstetter et al.

(10) Patent No.: US 7,351,982 B2
(45) Date of Patent: Apr. 1, 2008

(54) PORTABLE NUCLEAR MATERIAL DETECTOR AND PROCESS

(75) Inventors: Kenneth J Hofstetter, Aiken, SC (US); Charles K Fulghum, Aiken, SC (US); Lawrence J Harpring, North Augusta, SC (US); Russell K Huffman, Augusta, GA (US); Donald L Varble, Evans, GA (US)

(73) Assignee: Washington Savannah River Company LLP, Aiken, SC (US)

( * ) Notice: Subject to any disclaimer, the term of this patent is extended or adjusted under 35 U.S.C. 154(b) by 34 days.

(21) Appl. No.: 11/135,801

(22) Filed: May 24, 2005

(65) Prior Publication Data

US 2006/0266948 A1 Nov. 30, 2006

(51) Int. Cl.
*G01T 3/00* (2006.01)
(52) U.S. Cl. .................................. 250/390.01
(58) Field of Classification Search ............ 250/370.01
See application file for complete search history.

(56) References Cited

U.S. PATENT DOCUMENTS

| 3,997,787 | A | * | 12/1976 | Fearon et al. | 250/359.1 |
| 4,140,911 | A | * | 2/1979 | Todt et al. | 250/390.01 |
| 4,617,167 | A | * | 10/1986 | Kruse et al. | 376/153 |
| 5,258,926 | A | * | 11/1993 | Duftschmid et al. | 250/375 |
| 5,345,084 | A | | 9/1994 | Byrd | |
| 5,638,420 | A | | 6/1997 | Armistead | |
| 6,347,132 | B1 | | 2/2002 | Annis | |
| 6,448,564 | B1 | | 9/2002 | Johnson et al. | |
| 6,507,025 | B1 | | 1/2003 | Verbinski et al. | |
| 2002/0175291 | A1 | | 11/2002 | Reeder et al. | |
| 2003/0201394 | A1 | | 10/2003 | Peoples | |
| 2003/0226971 | A1 | | 12/2003 | Chandross et al. | |
| 2004/0073808 | A1 | | 4/2004 | Smith et al. | |
| 2004/0104347 | A1 | | 6/2004 | Bross et al. | |
| 2006/0170541 | A1 | * | 8/2006 | Tompa et al. | 340/500 |

OTHER PUBLICATIONS

Product Sheet, Linear Radiation Monitor, Sensor Technology Engineering, Inc., Santa Barbara, CA. Undated.
Sensor Technology Engineering, Inc., "Instruction Manual For The LRM Linear Radiation Monitor With Neutorn Detectin Package", 28 pages plus cover; Sensor Technology Engineering, Inc., Santa Barbara, California 93117, undated.

(Continued)

*Primary Examiner*—David Porta
*Assistant Examiner*—Marcus H Taningco
(74) *Attorney, Agent, or Firm*—J. Bennett Mullinax, LLC

(57) ABSTRACT

A portable, hand held, multi-sensor radiation detector is disclosed. The detection apparatus has a plurality of spaced sensor locations which are contained within a flexible housing. The detection apparatus, when suspended from an elevation, will readily assume a substantially straight, vertical orientation and may be used to monitor radiation levels from shipping containers. The flexible detection array can also assume a variety of other orientations to facilitate any unique container shapes or to conform to various physical requirements with respect to deployment of the detection array. The output of each sensor within the array is processed by at least one CPU which provides information in a usable form to a user interface. The user interface is used to provide the power requirements and operating instructions to the operational components within the detection array.

8 Claims, 5 Drawing Sheets

OTHER PUBLICATIONS

Sensor Technology Engineering, Inc., Invovice #02185, dated Aug. 8, 2002 1 page (Redacted).

Warren, John L., & Vadnais, Kenneth G., "Linear Radiation Monitor (LRM), A Time Efficient Detector For Searching Intermodal Container Ships", Sensor Technology Engineering, Inc., Mar. 2000, 4 pages including cover sheet.

* cited by examiner

PORTABLE NUCLEAR MATERIAL DETECTOR AND PROCESS

This invention was made with Government support under Contract No. DE-AC0996-SR18500 awarded by the United States Department of Energy. The Government has certain rights in the invention.

FIELD OF THE INVENTION

This invention is directed towards a nuclear radiation detector and process suitable for use with large-scale monitoring applications such as cargo ships, buildings, warehouses, and similar structures. The monitoring system and apparatus uses a plurality of independently operated nodes which are connected into a flexible linear strand. The length of the strand and the positioning between the sensor nodes may be provided at various intervals as needed. The monitoring apparatus and process may be operated and monitored using a personal digital assistant (PDA) or a more conventional stand-alone computer system or similar device including a CPU.

BACKGROUND OF THE INVENTION

This invention relates to nuclear radiation monitoring systems. It is well known in the art to provide fixed inspection stations such as the one seen in U.S. Pat. No. 5,638,420. The fixed inspection station in this referenced patent uses beams of x-rays in association with opposing detectors to identify nuclear material and other contraband.

Published U.S. Patent Application 2004/0073808 to Smith et al sets forth a detection network system of a plurality of interconnected multiple connectors which are positioned in association with a cargo shipment. The multiple sensors are designed to be present within the cargo carrier at fixed, permanent locations during shipment and may be remotely monitored for a variety of functions including the presence of nuclear/radioactive materials.

U.S. Patent Application 2003/0201394 to Bartlett Support Systems discloses a crane mounted cargo container which may be used to inspect individual cargo items during loading/unloading operations. Sensors positioned on the crane are used to determine the presence of contraband such as nuclear or radioactive materials within the cargo. Remote communication protocols can be used to signal an alert upon receiving detector information consistent with a contraband item.

U.S. Patent Publication 2002/0175291 is directed to a radiation survey instrument which provides for a scintillation detector which is capable of determining two different types of radiation such as alpha radiation along with the presence of either beta and/or gamma radiation.

However, none of the references identified above provide for a portable radiation detection apparatus having multiple sensing nodes which may be contained in a flexible and positionable array. There remains a need for an apparatus and process for a portable radiation sensor which permits the rapid screening of large volume sites such as commercial cargo containers including tractor trailers, ocean cargo shippers, and commercial shipping pods, as well as buildings, warehouses, and similar structures. There remains a need for a nuclear radiation detecting apparatus in which a plurality of independently functioning detectors may be positioned in narrow gaps and confined spaces. Additionally, there remains a need to facilitate rapid, large scale detection operations without the use of potentially harmful x-ray based diagnostic sensing methodology.

Accordingly, there remains room for improvement and variation within the art.

SUMMARY OF THE INVENTION

It is one aspect of at least one of the present embodiments of the invention to provide for a portable radiation sensor array having multiple sensor locations, the sensors within the array being supplied within a flexible covering.

It is yet an additional aspect of at least one of the present embodiments to provide for a radiation sensor array in which a plurality of spaced sensors are positioned within a flexible sheath, the flexible sheath permitting the array to assume a multitude of curved and angled placement geometries.

It is still a further and more particular aspect of at least one embodiment of the present invention to provide for a radiation detector comprising a plurality of spaced, omni-directional sensors which is portable and may interface with a PDA device which is used to control and monitor the sensor functions.

It is yet a further and more particular aspect of at least one embodiment of the present invention to provide for a radiation detector comprising a plurality of spaced sensors, each sensor in communication with at least one CPU, each sensor detecting a radiation count and each sensor being in further operative engagement with a flexible support structure.

It is yet a further and more particular aspect of at least one embodiment of the current invention to provide for a portable radiation sensor which provides for a plurality of omni-directional radiation detectors which may be positioned within a 2 to 4 inch gap maintained between commercial cargo pods such as those present on ocean cargo vessels. Additionally, the sensor array is lightweight such that it may be carried by a single individual and provides real time information to an operator of radiation levels which exceed ambient background levels.

It is yet a further and more particular aspect of at least one embodiment of this invention to provide for a radiation sensor comprising an array of spaced radiation detectors, each detector being maintained within a fabric housing, said housing being flexible to allow the array to assume a wide number of placement geometries.

These and other aspects of this invention are provided by an apparatus for detecting nuclear radiation comprising a plurality of Geiger Muller tubes in communication with a common power source, each Geiger Muller tube in further communication with a corresponding analog-to-digital converter; a CPU in communication with each of the corresponding converters, the CPU calculating a radiation value for each of the plurality of Geiger Muller tubes; a user interface for receiving and displaying information from each of the converters, thereby providing information on detected radiation levels; and, a flexible housing surrounding the plurality of Geiger Muller tubes wherein the flexible housing and the Geiger Muller tubes will form a substantially linear array when suspended from an elevated support.

Other aspects of the invention are provided by an apparatus for detecting nuclear radiation comprising: a plurality of individual radiation detectors, each of the individual radiation detectors positioned along a communication array at a pre-selected interval, the communication array comprising a first electrical supply line for supplying power to each of the plurality of detectors and a second electrical supply line for supplying power to a plurality of analog-to-digital converters in operative engagement with a corresponding radiation detector; a flexible covering surrounding the plurality of radiation detectors and the communication array, the flexible covering allowing the plurality of individual radiation detectors and the communication array to assume a position in a configuration selected from the group consisting of a linear arrangement, a curve, an angled bend, and combinations thereof; a CPU in communication with each of the plurality of analog-to-digital converters; and, a user interface for receiving and displaying data from each of the analog-to-digital converters.

The apparatus for detecting nuclear radiation may also include embodiments where the plurality of Geiger Muller tubes and the plurality of corresponding analog-to-digital converters are in parallel communication with said CPU. Further, the flexible housing may comprise a fabric sheath which contains therein the plurality of Geiger Muller tubes and the corresponding analog-to-digital converters.

The apparatus for detecting nuclear radiation may also provide a PDA as the user interface as well as including a plurality of CPUs, each individual CPU of the plurality of CPUs in communication with a corresponding analog-to-digital converter.

Preferably, the flexible housing surrounding the plurality of Geiger Muller tubes defines an outer diameter of about one inch or less. The Geiger Muller tubes may further define at least one Geiger Muller tube adapted for detecting gamma radiation and at least one Geiger Muller tube adapted for detecting neutron radiation.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Figure 1:
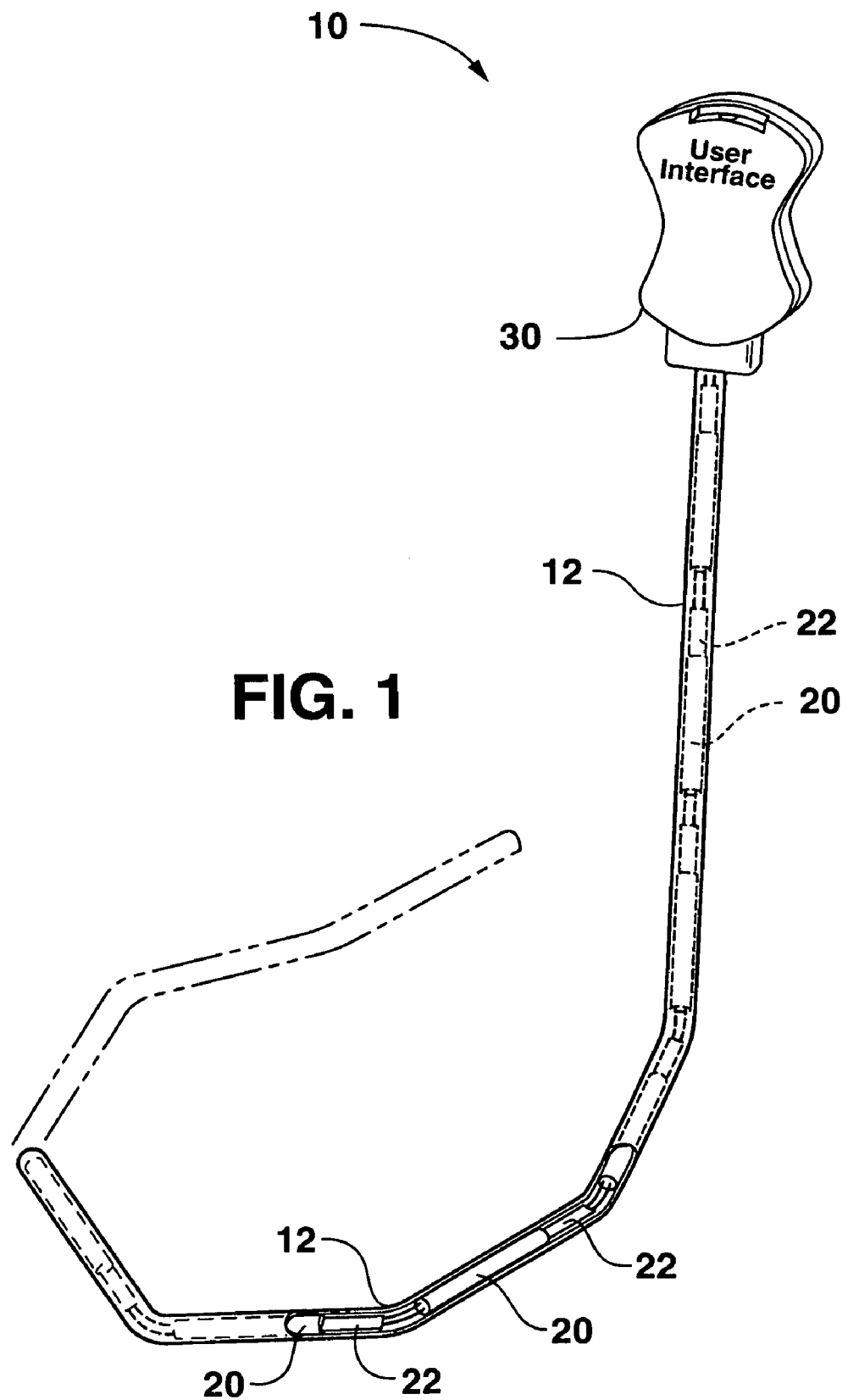
FIG. 1 is a perspective view in partial section showing details of the present invention.

As seen in reference to a specific embodiment set forth in FIG. 1, a portable radiation detector instrument is provided having multiple, independent detection sensors positioned at desired lengths along a flexible support. The portable detection array 10 comprises a series of spaced omni-directional radiation sensors 20 seen here in the form of Geiger Muller tubes (Model No. 74321, LND, Inc., Oceanside, N.Y.). Each sensor operates with well known scintillation detector technology employing a pressurized gas contained within the tube. Sensor interface 22 comprises a resistor-capacitor charge circuit and an analog-to-digital converter circuit. The digital signal from the sensor interface 22 is transmitted to a processor using a Dallas Semiconductor Corporation, (Dallas, Tex.) developed protocol. The processor evaluates the measured voltage for each sensor 20 via sensor interface 22 to calculate the corresponding radiation level for each of the respective sensors. The array of sensors 20 is connected to a user interface 30 through a sensor input 41.

Figure 5:
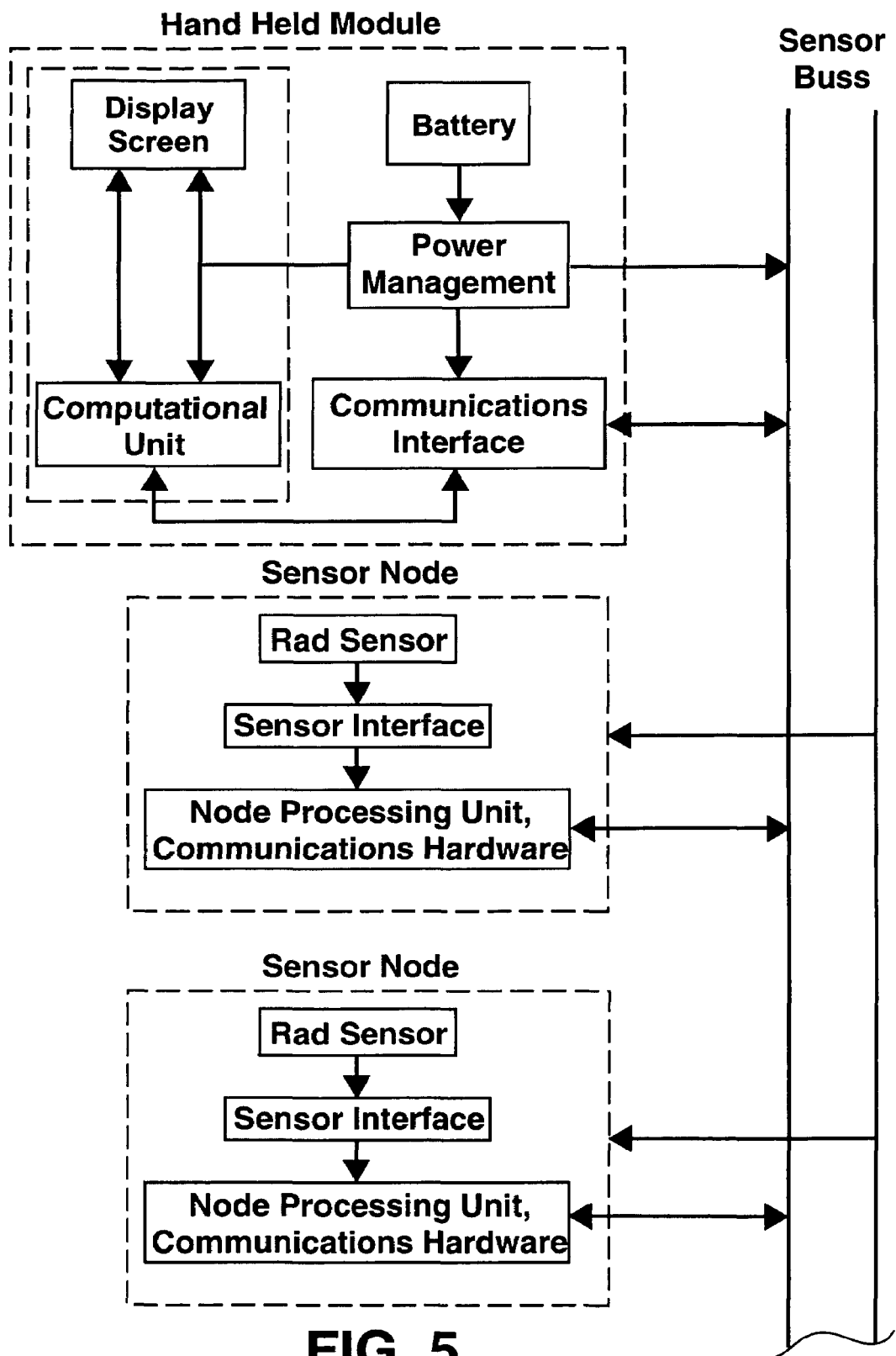
FIG. 5 is a schematic view of an alternative embodiment of the present invention using microcontroller hardware in association with each radiation sensor.
Figure 6:
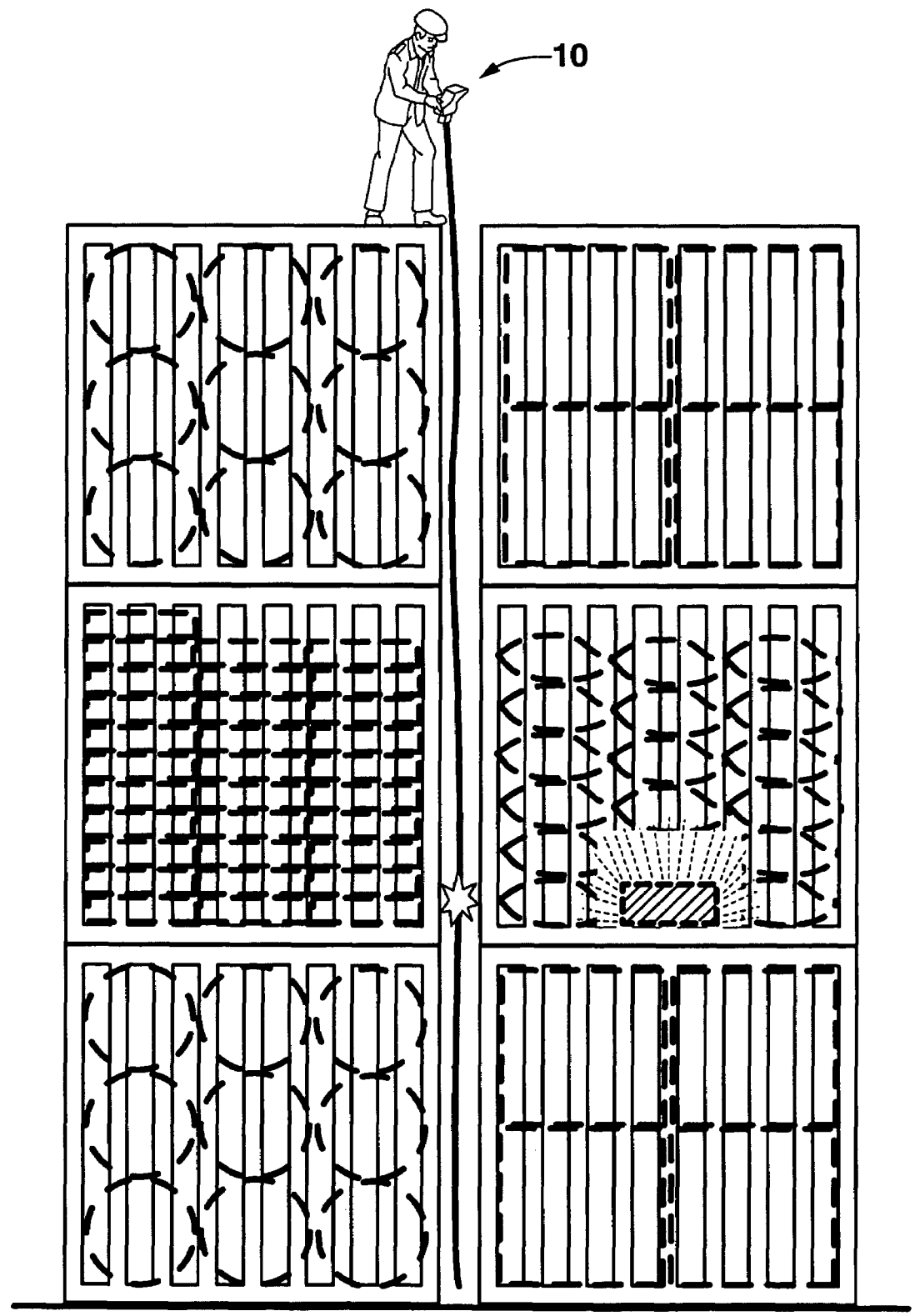
FIG. 6 is a schematic view of a flexible radiation detector array according to various embodiments of the present invention.

In a preferred embodiment, and as best seen in reference to FIG. 5, a 500 Vdc bussed power may be supplied to each detection array 10. In addition, a 5 Vdc buss is also provided to operate the analog-to-digital converter of interface 22. As seen in reference to FIG. 5, each sensor 20 with interface 22 is designed to operate independently of other sensors within the detection array 10. The 5 Vdc buss is used to operate the communication interface 40 along with the node processing unit of each sensor interface 22. The 500 Vdc buss is used to power the radiation sensor 20.

Figure 2:
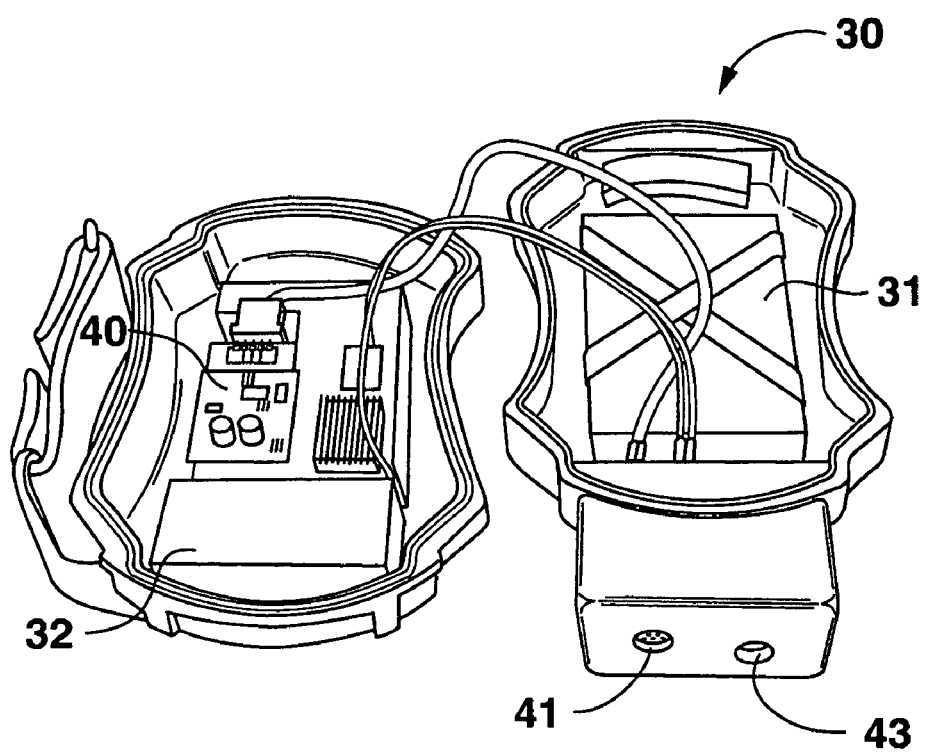
FIG. 2 is a perspective view of a user interface which may be used to operate and monitor the radiation detector array.
Figure 3:
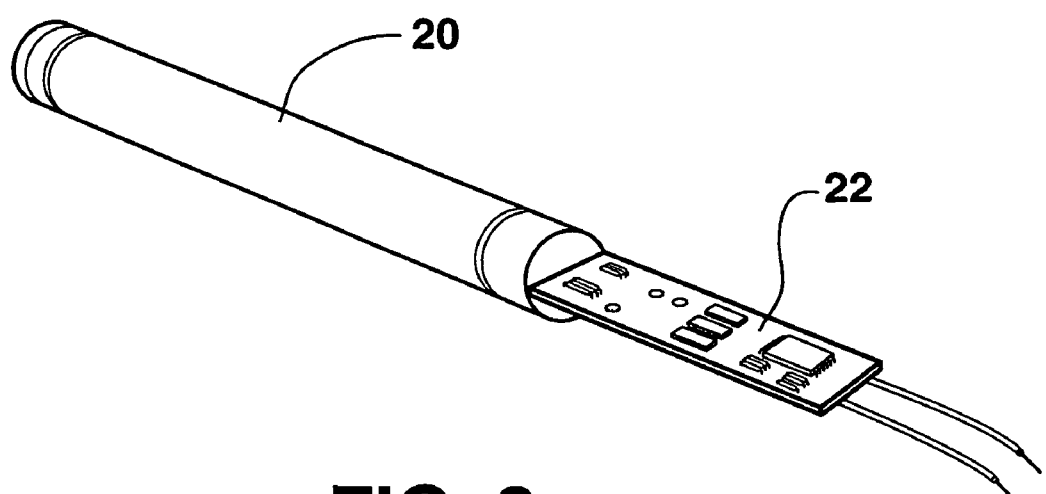
FIG. 3 is a perspective view in partial section illustrating the omni-directional detector unit along with associated circuit boards used to coordinate the flow of information between the sensor and a CPU.

As further seen in reference to FIGS. 1 and 2, a user interface 30 having a display screen is provided and may be in the form of a personal digital assistant (PDA) device 31. Software enables the PDA to operate as a user interface so as to provide the processor/CPU capabilities for the sensor node computational analysis. A lithium polymer battery 32 (FIG. 2) in combination with the power management board 34 provide operating power for the PDA with separate supply leads for the 5 Vdc and 500 Vdc bussed power supplies. A recharger can be connected to user interface 30 via connection 43.

While the presently described embodiment illustrates a user interface 30 which incorporates a PDA, other forms of a microprocessor or CPU may be used including portable computers and other portable computational devices. It is also envisioned that, using wireless communication protocols, a remote computer may be used to provide the computational analysis which is then transmitted to a hand held interface. In such an embodiment, either the hand held interface or a separate power supply may be used to provide power to the sensor 20 and sensor interface 22.

Figure 4:
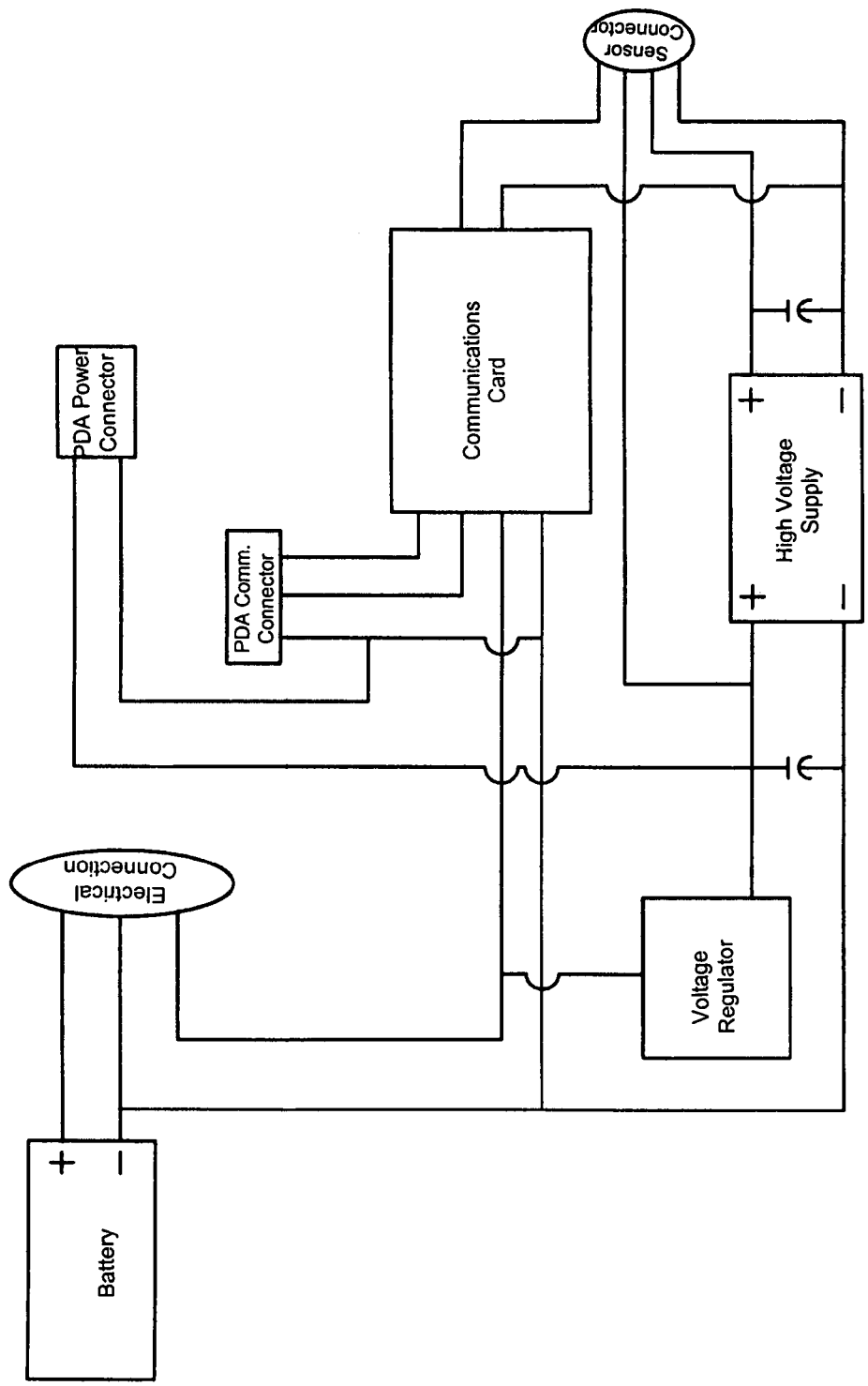
FIG. 4 is a schematic of a PDA operated device as seen in reference to FIG. 2.

As illustrated in FIGS. 4 and 5, the detection array 10 may be provided in which a microcontroller 40 such as a Motorola Model No. M68M0D912C32 (Austin, Tex.) is placed in operational engagement with each sensor 20. The microcontroller 40 receives output from the sensor 20 and may then process the sensor output to compute corresponding radiation levels. It is believed beneficial to use suitable algorithms which allow for the subtraction of background radiation with respect to each sensor 20 within the array 10. One suitable algorithm is a hybrid floating mean algorithm developed by Savannah River National Laboratory as described in the publication "Microprocessor Implementation of a Time Variant Floating Mean Counting Algorithm" published in Nuclear Instruments and Methods in Physics Research 431 (1999) 556-562 and incorporated herein by reference and as further described in reference to U.S. patent application Ser. No. 09/890,222, filed on Oct. 30, 2001, and incorporated herein by reference.

By applying the computational hardware as part of sensor interface 22 with each sensor 20, the computational demands on a single PDA type processor are substantially reduced. In turn, the speed and rate of information exchange using a PDA type interface is greatly enhanced. As such, sensor arrays with an increasing number of nodes may be more easily implemented. Further, the increased computational speed and communication rate facilitates the real time capture and display of radiation levels from each sensor within the array. Further, the computational speed is sufficient such that the sensor array provides useful real-time feedback when the detection array 10 is deployed at an individual's normal walking speed.

Sensors 20, in the embodiments described and shown, are omni-directional Geiger Muller tube sensors which are sensitive to gamma radiation. These types of sensor tubes are widely available in a variety of useful lengths, outside diameters, and sensitivities. Further, similar Geiger Muller tube sensors are available which are responsive to neutron radiation. The independent sensor operation capabilities of the present detection array 10 allow for different types of sensors 20 to be incorporated within a single array 10. In this manner, a single sensor array can deploy both gamma and neutron radiation sensors if desired.

As best seen in reference to FIG. 4, set forth is the schematic of a user interface which may be connected to a PDA device as configured for use with the detection array 10. As seen in the accompanying figures, both high and low voltage electrical connections are provided, and the detection array 10 is configured so as to be easily expandable by connection of additional radiation detectors 20 and sensor interfaces 22. Further, each sensor node is designed to work independently of the other nodes and in fact can operate even when one or more separate sensor nodes are inoperative.

As further seen in reference to FIG. 1, functional components of detection array 10 are housed within a sheath 12. The sheath may be in the form of one or more fabric or plastic tubes through which the sensor and electrical components of array 10 are placed. Alternatively, sheath 12 may be provided by a flat fabric panel which is wrapped around the internal components of array 10 and secured by a reversible fastener such as a hook and loop fastener. It has also been found useful to provide a sheath from a fabric having elastic properties. The elastic nature of the sheath allows the internal components to be held under a slightly compressive force to maintain the compact shape. Further, the flexible and elastic nature of the sheath 12 allows the array 10 to assume a variety of different shapes and positions. A variety of suitable fabric materials may be used, however, it is believed desirable to select fabrics which minimize the risk of generating static electricity.

The use of a flexible sheath 12 contributes to the portability and ease of use of the array 10. For instance, various electrical buss lines are enclosed within the sheath thereby avoiding entanglement risks with foreign objects or projections during use, transport, or storage of the detection array 10. Additionally, the sheath 12 helps disguise the nature of the array for situations where low visibility of the detection process may be beneficial.

One useful operating environment for the detection array is on cargo ships. Transoceanic cargo ships make frequent use of shipping containers such as Conex boxes which may have dimensions of 8 ft×8 ft×40 ft. Typically, the shipping boxes are placed in multiple stacked groups and, to maximize cargo capacity, the boxes are positioned just a few inches apart. The detection array 10 provides for a portable sensor which can be suspended between the narrow width separating stacked cargo containers. A user of the detection array 10 may then "walk" the length of the stacked containers. The detection array 10 is easily raised at the end of each cargo container in order to navigate around the locking mechanisms between adjacent stacks. The detection array is able to provide real-time information with respect to radiation levels which facilitates the rapid screening of numerous cargo pods in a brief time period. Should the detection array 10 indicate an unusual reading, the detection array 10 can be used to isolate and identify the individual cargo box and portion of the box which may warrant further investigation.

The radiation detection array 10 allows for a 40 ft length of a sensor array having 16 spaced sensors to be provided with a net weight of less than 10 pounds. Such an apparatus is easily transported and may be field deployed and used by a single individual. The small dimensions of the array 10 are ideally suited for placement between the narrow separation width of commercial cargo shipments.

Currently, U.S. Customs and Coast Guard regulations allow for boarding and inspection of inbound cargo ships while 8 hours from port. The current portable sensor array is the only instrument which can provide for real-time radiation information from multiple cargo shipping pods. Accordingly, the present array allows for a more efficient inspection of cargo for nuclear contraband. The rapid screening allows time for further investigation of cargo irregularities prior to a shipping vessel being brought into port.

Likewise, the described advantages and features of the present sensor are useful with respect to custom warehouses, commercial trucking hubs, railroad shipments, and air cargo shipments. The flexible nature of the array 10 allows for a single array to be positioned simultaneously along with a side and top surface of a shipping container, or, for example, placed in a horizontal position along a container, a stack of shipping drums, odd sized collection of shipping pallets, boxes, and other irregularly shaped shipping materials and containers.

The flexible array 10 may also be used in either a temporary or permanent placement for monitoring a doorway or entrance. The array 10 can be positioned along the sides and top of an entrance threshold and may be hidden from view by placement behind a decorative molding. In this manner, individuals and materials passing through the doorway can be monitored in real time. The flexible array can be easily adapted for temporary or permanent deployment within passenger or freight elevators, hallways, and similar locations.

The flexible array is also useful for shipping companies that handle large volumes of various sized parcels originating from many sources. For instance, package handlers, such as the United States Postal Service, FedEx®, UPS®, and other commercial vendors, may incorporate the sensor array along existing packaging conveying equipment. It is well within the ordinary skill level of one in the art to position the sensor array for automated measurements which are designed to signal an alarm should a threshold level of radiation be exceeded. In this manner, the contents of commercial cargo can be monitored in a variety of commercial shipping locations including cargo intake points, central distribution nodes, or on selected shipments or routes where a higher risk of contraband is perceived. In such scenarios, the present sensor is capable of detecting both contraband and authorized shipments which may have become damaged or, through improper packaging, are releasing inappropriate levels of radiation. The present sensor allows such shipments to be intercepted and quarantined, thereby minimizing exposure to workers and the potential cross contamination of intermingled cargo items.

The detection array 10 may also be used to generate a radiation map or profile of a work area, field or plot, or other similar environment. For example, if stretched horizontally and walked across an open field such as a field, grid-like pattern of readings can be generated by the array 10 to provide a radiation field map. Array 10, given its flexible and portable nature, can also be inserted into areas behind walls, along crawl spaces, and along maintenance conduits associated with nuclear power plants or other nuclear handling facilities. Given the low cost of the sensor, should radiation, chemical and/or biological contamination of the sensor occur, the sensor array can be considered a disposable item which can be replaced more easily than the decontamination costs.

The detection array 10 may also be incorporated into a passive monitoring system to provide early warning within a ventilation system or an off gas system should radiation levels exceed a predetermined threshold amount.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. An apparatus for detecting nuclear radiation comprising:
    a plurality of individual radiation detectors, each of said individual radiation detectors positioned along a communication array at a pre-selected interval, said communication array comprising an electrical supply line for supplying power to each of said plurality of detectors;
    a flexible covering surrounding said plurality of radiation detectors and said communication array, said flexible covering allowing said plurality of individual radiation detectors and said communication array to assume any configuration selected from the group consisting of a linear arrangement, a curve, an angled bend, and combinations thereof;
    an individual CPU in communication with each of said plurality of individual radiation detectors, said individual CPU in communication with a time variant counting algorithm wherein each of said individual radiation detectors has an individual radiation background value adjustment as an integral processing step of calculating a radiation value; and,
    a user interface for receiving and displaying data from each of said analog-to-digital converters.

2. The apparatus for detecting nuclear radiation according to claim 1 wherein said plurality of Geiger Muller tubes each in independent and simultaneous communication with said CPU.

3. The apparatus for detecting nuclear radiation according to claim 1 wherein said flexible covering comprises a fabric sheath which contains therein said plurality of Geiger Muller tubes and said corresponding individual CPUs.

4. The apparatus for detecting nuclear radiation according to claim 1 wherein said user interface is a PDA.

5. The apparatus for detecting nuclear radiation according to claim 1 wherein said flexible covering surrounding said plurality of Geiger Muller tubes defines an outer diameter of about one inch or less.

6. The apparatus for detecting nuclear radiation according to claim 1 wherein said plurality of Geiger Muller tubes further defines at least one Geiger Muller tube adapted for detecting gamma radiation and at least one Geiger Muller tube adapted for detecting neutron radiation.

7. The apparatus according to claim 1 wherein the combination of the radiation detector and said respective separate CPU collectively defining a sensor node, each sensor node in independent and simultaneous communication with said user interface.

8. A portable apparatus for detecting nuclear radiation comprising:
    a plurality of nodes positioned in a linear arrangement, each node comprising a radiation detector and a microprocessor, each node having a first electrical supply line in communication with said radiation detector and a second electrical supply line to a signal converter, each signal converter in operative engagement with said corresponding radiation detector;
    a flexible covering surrounding said plurality of nodes, said flexible covering allowing each said node movement relative to any adjacent node such that said apparatus may assume a configuration selected from the group consisting of a linear arrangement, a curve, an angled bend, and combinations thereof;
    a CPU in communication with each node, said CPU in communication with a time variant counting algorithm wherein each of said individual radiation detectors has an individual radiation background value adjustment as an integral processing step of calculating a radiation value; and,
    a user interface for receiving and displaying data from each of said radiation detectors and respective CPU.

* * * * *